Aug. 25, 1931.  J. G. CALIS  1,820,728
TRUCK
Filed Feb. 21, 1929  3 Sheets-Sheet 1
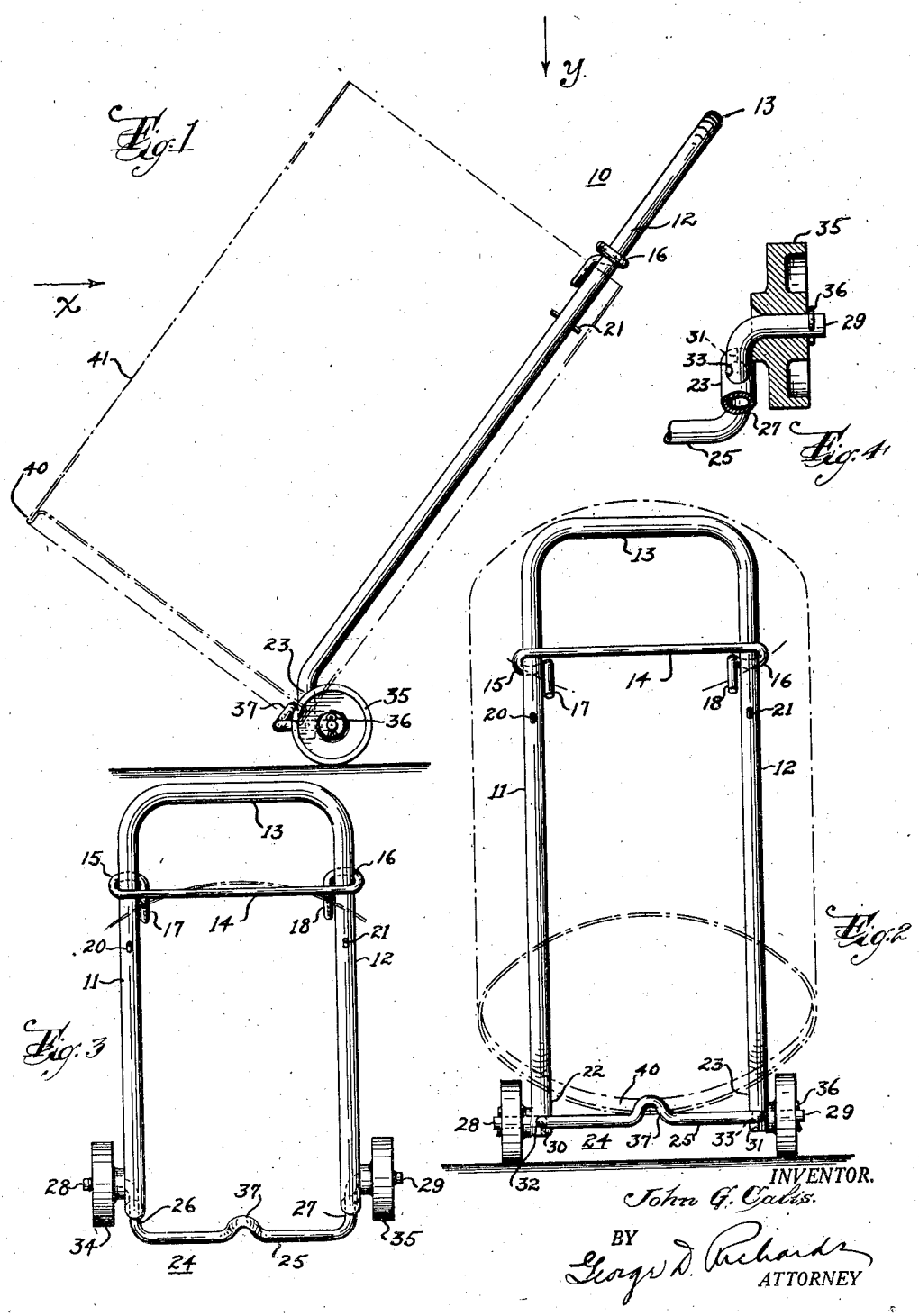
INVENTOR.
John G. Calis.
BY
George D. Richards
ATTORNEY Aug. 25, 1931.    J. G. CALIS    1,820,728
TRUCK
Filed Feb. 21, 1929    3 Sheets-Sheet 2
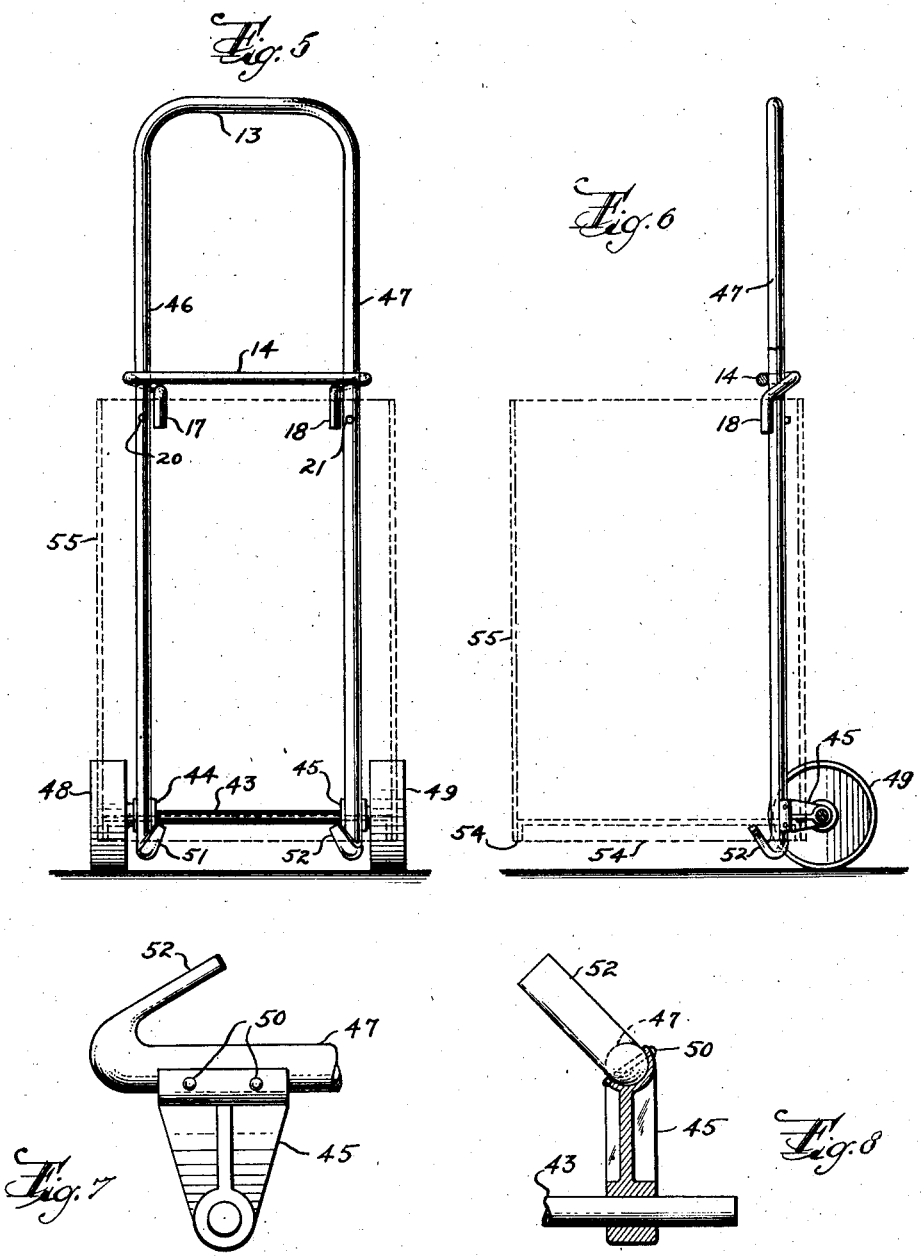
INVENTOR
John G. Calis.
BY
George D. Richards
ATTORNEY Aug. 25, 1931.  J. G. CALIS  1,820,728
TRUCK
Filed Feb. 21, 1929   3 Sheets-Sheet 3
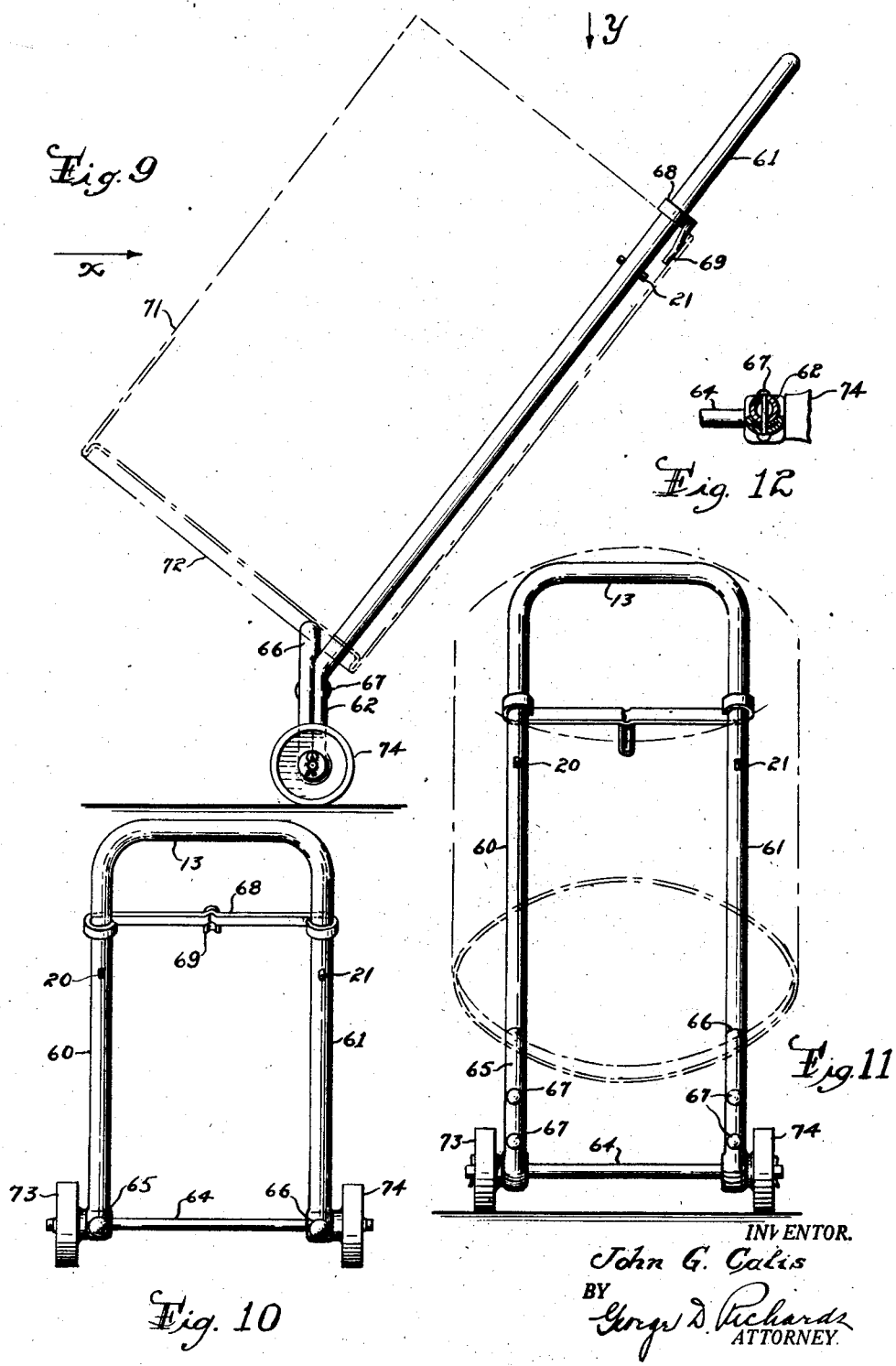

Patented Aug. 25, 1931

1,820,728

UNITED STATES PATENT OFFICE

JOHN G. CALIS, OF CLIFTON, NEW JERSEY

TRUCK

Application filed February 21, 1929. Serial No. 341,624.

This invention relates, generally, to improvements in trucks used for moving articles or containers; and the invention has reference, more particularly, to a construction of hand operated truck provided with a novel means for retaining the article carried upon the truck to thereby prevent its accidental displacement therefrom.

It is the object of this invention to provide a novel construction of truck especially adapted to carry containers such as ash cans, garbage cans and the like which trucks are adapted to be operated for carrying such containers from room to room or up and down stairs, etc., with a maximum of ease and without danger of the container dropping off of the truck.

Another object of the invention is to provide a truck of the above character that is of extremely simple and rugged construction and which is easily operated.

Other objects of this invention, not at this time more particularly enumerated, will be clearly understood from the following detailed description of the same.

With the various objects of this invention in view, the same consists, primarily, in the novel construction and arrangement of truck hereinafter set forth; and, the invention consists, furthermore, in the novel arrangements and combinations of the various devices and parts, as well as in the details of the construction of the same, all of which will be hereinafter more fully described, and then finally embodied in the claims appended hereto.

The invention is clearly illustrated in the accompanying drawings, in which:—

Figure 1 is a view in side elevation of the novel truck of this invention, the same being illustrated in its inclined, normal operating position for carrying a container which is shown in dot and dash lines;

Figure 2 is a view looking in the direction of the arrow designated by the reference character x in Figure 1;

Figure 3 is a view looking in the direction of the arrow designated by the reference character y in Figure 1;

Figure 4 is an enlarged view with parts broken away of a portion of the truck illustrated in Figure 1;

Figure 5 is a view illustrated in front elevation of a slightly modified form of truck, the same being illustrated in vertical position and supporting a container shown in dot and dash lines;

Figure 6 is a view in side elevation of the structure shown in Figure 5;

Figure 7 is an enlarged fragmentary side view of the lower portion of a side bar and attached axle bracket of the truck shown in Figure 5;

Figure 8 is an enlarged fragmentary view partly in section looking at the lower end of one of the side bars of the truck shown in Figure 5;

Figure 9 is a view similar to Figure 1 of a modified form of truck;

Figure 10 is a view looking in the direction of the arrow designated by the reference character y in Figure 9;

Figure 11 is a view looking in the direction of the arrow designated by the reference character x in Figure 9; and Figure 12 is a sectional view of the lower portion of a side bar of the truck shown in Figure 9.

Similar characters of reference are employed in all of the hereinabove described views, to indicate corresponding parts.

Referring now to Figures 1 to 4 of the said drawings, the novel truck of this invention is indicated as a whole by the reference numeral 10. Truck 10 comprises a unitary frame member which consists of parallel side bars 11 and 12 spaced apart and connected at their upper ends by a handle bar 13. This frame member is preferably formed from a single piece of hollow tubing or pipe which is bent into the desired shape. An adjustable retaining member 14 is slidably mounted on the side bars 11 and 12. Retaining member 14 is adapted to retain the upper ends of containers, such as ash or garbage cans, upon the frame 10 and substantially in contact with the side bars 11 and 12 in a manner to be described. Retaining member 14 comprises a transversely extending rod having loops 15 and 16 formed at its ends. Loops 15 and 16 extend completely around the outside of the side bars 11 and 12 and have catches 17 and 18 formed thereon. Catches 17 and 18 project downwardly substantially at right angles to the plane of the loops. Catches 17 and 18 are adapted to project into the upper end of containers and to engage the inner sides thereof to thereby retain such containers against the side bars 11 and 12 and upon the truck 10. Oppositely aligned stop pins 20 and 21 extend through and are secured within apertures in the side bars 11 and 12 respectively. Stop pins 20 and 21 are positioned upon the side bars 11 and 12 so as to be below the top of the smallest container that is intended to be carried by the truck. These stop pins act to limit the downward movement of the retaining member 14 by engaging the loops 15 and 16 of this member.

The side bars 11 and 12 have lower slightly off-set end portions 22 and 23 to which an axle 24 is secured. Axle 24 comprises a transverse portion 25, two rearwardly extending portions 26 and 27 at the ends of this transverse portion and trunnions 28 and 29 formed on the portions 26 and 27. Axle 24 may be secured to the lower end portions 22 and 23 of the side bars in a plurality of ways but preferably as illustrated in the drawings. As thus illustrated, the rearwardly extending portions 26 and 27 extend through conforming apertures 32 and 33 in the end portions 22 and 23. Below these apertures, the end portions of the side bars are diametrically slotted at 30 and 31 and the two halves of each of the end portions so formed are pressed together, thereby causing the walls of the apertures 32 and 33 to rigidly grip and immovably secure the axle 24 to the side bars 11 and 12. This method of fastening the axle to the side bars eliminates the necessity of all extraneous fastening means and utilizes the gripping action of the side bars to secure this result. If desired, additional fastening means such as rivets may be employed to extend through the points of junction of the axle and side bars.

Axle 24 has wheels 34 and 35 rotatably mounted on its trunnions 28 and 29. Wheels 34 and 35 are retained on these trunnions as by cotter pins 36. The transverse portion 25 of the axle 24 is provided with an offset hook portion 37 which extends upwardly in the direction of the length of the side bars. Hook portion 37 is adapted to engage the underside of the container bottoms for the purpose of supporting and retaining such containers upon the truck 10. Where the containers have peripheral downwardly extending flanges at their bottoms such as the flange 40 of the container 41 illustrated in Figures 1 and 2, the peculiar construction of the axle 24 causes the hook portion 37 to extend upwardly and inwardly of such flange 40 and engage the bottom of the container. The hook 37 not only acts to support the container 41 but also prevents the bottom of the same from accidentally sliding off of the truck 10. Should the bottom of container 41 tend to slide off of the truck, the hook portion 37 will engage the inner surface of flange 40 and prevent the displacement of the container. Although this hook portion is illustrated as of substantially semi-circular contour having a rounded top portion it is obvious that it may have other contours with a flat top portion for example, and may extend the full width of the frame member.

In operation, it is merely necessary to place the container, such as an ash or garbage can, upon the truck 10 so that the bottom of the container rests upon the axle 24 and its sides engage the side bars 11 and 12. The retaining member 14 is then slipped downwardly so as to cause the catches 17 and 18 to project into the upper end of the container and engage the inner sides thereof to thereby retain the container against the side bars 11 and 12. The truck carrying the container may now be wheeled from place to place or lifted by means of the handle bar 13 upstairs or carried downstairs without fear of dropping the container off of the truck. This is because the container is secured at its upper end to the truck by the retaining member 14 and at its lower end to the truck by the action of the hook portion 37.

In the arrangement illustrated in Figures 5 to 8, a straight transverse axle 43 is employed and this axle is carried by brackets 44 and 45 that are secured to the side bars 46 and 47 as by rivets 50. Wheels 48 and 49 are mounted on the outer end portions of the axle 43. The lower end portions of the side bars 46 and 47 are bent upwardly and flattened to form hook portions 51 and 52 that are adapted to engage the underside of containers in the same manner that hook portion 37 of axle 24 engages such containers. Thus, in Figures 5 and 6, the hook portions 51 and 52 extend upwardly within the inner periphery of the depending flange 54 of the container 55 and by engaging the inner walls of this flange prevent the accidental displacement of the bottom of the container from the truck. The retaining member 14 acts as before to retain the upper portion of the container in engagement with the side bars 46 and 47. With the container thus mounted upon the truck it may be moved from place to place or held in various positions, such as the vertical position illustrated in Figures 5 and 6, without the possibility of the container becoming dislodged from the truck.

It will be apparent that containers may be handled by the truck even though the retaining member 14 is not brought into operative relation with the inner sides of the container as for example, when containers are handled with their covers in place.

In the arrangement illustrated in Figures 9 to 12, the side bars 60 and 61 are bent to form lower off-set portions 62. Off-set portions 62 extend down and around the axle 64 and then upwardly in folded overlying relation as illustrated in these figures. The free ends of the side bars 60 and 61 terminate in upwardly extending hook portions 65 and 66. In forming the lower off-set portions 62, the portions of the side bars that are bent around the axle in overlying relation are retained in abutting fixed relation as indicated especially in Fig. 12 by rivets 67 that extend through the off-set portions. The side bars are flattened where they extend around the axle 64 which results in a strong connection between the side bars and the axle. Wheels 73 and 74 are mounted on the outer end portions of the axle 64. A retaining member 68 having but a single catch 69, that is positioned substantially midway between the side bars, as illustrated, is adapted to cooperate with hook portions 65 and 66 in retaining containers upon the truck. It will be apparent that the catch 69 if desired may be placed at other positions transversely of the retaining member 68 and still serve to retain the container 71 upon the truck. The lower peripheral flange 72 of the container is adapted to rest in the grooves formed between the hook portions and the side bars, and the hook portions project upwardly inside of the peripheral flange 72 and may abut the bottom of the container 71.

It is apparent that the construction presented in this modification is extremely simple, employing but an ordinary straight axle and at the same time doing away with axle brackets since the side bars themselves are so formed as to provide brackets of themselves as well as the retaining hook portions 65—66.

It will be noted that the novel truck of this invention is of extremely simple construction, comprising substantially but four parts consisting of the frame, retaining member, axle and wheels. This simple construction facilitates easy manufacture of the truck. The truck is of extremely rugged construction throughout and in operation acts to securely retain the article carried. This is important as it enables the truck to be carried about if desired or moved upstairs or down without fear of releasing the container therefrom.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A truck for moving containers comprising, a single piece frame member having parallel side bars uniformly spaced throughout their lengths and a transverse handle bar interconnecting the upper ends of said side bars, an axle for movably supporting said frame, wheels on said axle, the lower ends of said side bars being formed so as to directly grip and positively secure said axle to said frame member, and a unitary retaining member slidably mounted on said side bars, said retaining member having a transverse portion extending between said side bars with loops formed on the ends of said transverse portion, said loops respectively encircling said respective side bars for sliding engagement therewith, and depending catches formed on the free ends of said loops, each of said catches extending parallel with and disposed in close proximity to its respective side bar and cooperating with such side bar for the purpose of engaging and holding a container against such side bar and upon said truck.

2. A truck for moving containers comprising, a single piece frame member having parallel side bars uniformly spaced throughout their lengths and a transverse handle bar interconnecting the upper ends of said side bars, an axle for movably supporting said frame, said side bars being formed with lower slightly rearwardly offset end portions, said offset end portions being so formed as to directly grip and positively secure said axle to said frame members at spaced points on said axle, and wheels mounted on said axle exteriorly of said offset end portions, said axle being upwardly deformed at its central portion intermediate said side bars to provide a hook portion for engaging and retaining a container upon said truck.

3. A truck for moving containers comprising, a single piece frame member having parallel side bars uniformly spaced throughout their lengths and a transverse handle bar interconnecting the upper ends of said side bars, an axle for movably supporting said frame, said axle having a transverse portion terminating at its ends into two rearwardly extending portions, said rearwardly extending portions having transversely extending oppositely directed trunnions at their rearward ends, wheels mounted on said trunnions, said side bars having apertured lower end portions said end portions being diametrically slotted below said end portion apertures to provide for the insertion of the rearwardly extending portions of said axle through said diametric slots and into said apertures, the two halves of each thusly split side bar lower end portion being pressed together to cause each said side bar lower end portion to firmly grip and retain said axle to said frame member.

4. A truck for moving containers comprising, a single piece frame member having parallel side bars uniformly spaced throughout their length and a transverse handle bar interconnecting the upper ends of said side bars, an axle for movably supporting said frame, wheels on said axle, said axle being upwardly deformed at its central portion intermediate said wheels to provide a hook portion for engaging the bottom of a container, the lower ends of said side bars being formed so as to directly grip and positively secure said axle to said frame member, and a unitary retaining member slidably mounted on said side bars, said retaining member having a transverse portion extending between said bars with loops formed on the ends of said transverse portion, said loops respectively encircling said respective side bars for sliding engagement therewith, and depending catches formed on the free ends of said loops, each of said catches extending parallel with and disposed in close proximity to its respective side bar and cooperating with such side bar for the purpose of engaging and holding the upper portion of a container.

In testimony that I claim the invention set forth above I have hereunto set my hand this 24th day of December, 1928.

JOHN G. CALIS.